United States Patent
Yano (10) Patent No.: US 6,329,969 B1
(45) Date of Patent: Dec. 11, 2001

(54) INTEGRATED CIRCUIT FOR DRIVING LIQUID CRYSTAL

(75) Inventor: Takakazu Yano, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/319,593

(22) PCT Filed: Oct. 20, 1998

(86) PCT No.: PCT/JP98/04740

§ 371 Date: Jun. 8, 1999

§ 102(e) Date: Jun. 8, 1999

(87) PCT Pub. No.: WO99/21050

PCT Pub. Date: Apr. 29, 1999

(30) Foreign Application Priority Data

Oct. 20, 1997 (JP) .................................................. 9/286743

(51) Int. Cl.[7] .................................................. G09G 3/36
(52) U.S. Cl. .................. 345/87; 345/52; 345/95; 345/183; 349/149; 349/151
(58) Field of Search .................. 349/149, 151, 349/152; 345/87, 182, 183, 94, 95, 96, 204, 208, 210, 211

(56) References Cited

U.S. PATENT DOCUMENTS

| | | | |
|---|---|---|---|
| 4,687,300 | * 8/1987 | Kubo et al. | 349/151 |
| 5,461,400 | * 10/1995 | Ishii et al. | 345/182 |
| 5,608,559 | * 3/1997 | Inada et al. | 349/149 |
| 6,194,837 | * 2/2001 | Ozawa | 315/169.15 |

FOREIGN PATENT DOCUMENTS

| | | |
|---|---|---|
| 2-166492 | 6/1990 | (JP) . |
| 6-222378 | 8/1994 | (JP) . |
| 9-101496 | 4/1997 | (JP) . |

* cited by examiner

*Primary Examiner*—Mark Zimmerman
*Assistant Examiner*—Mackly Monestime
(74) *Attorney, Agent, or Firm*—Finnegan, Henderson, Farabow, Garrett & Dunner, L.L.P.

(57) ABSTRACT

A liquid crystal driving integrated circuit (101) mounted directly on a liquid crystal substrate, wherein the integrated circuit (101) comprises a plurality of power supply terminal arrays, each of which include a high voltage power input terminal (102), (112), a low voltage power input terminal (103), (113), and an intermediate voltage power input terminal (130), (131) and a plurality of signal input terminal arrays (104)–(108), (114)–(118). A substantially rectangular integrated circuit chip (101) containing the integrated circuit is divided into two halves along a line (123) intersecting, at right angles, the longer sides of the chip. A first power supply terminal array (102), (103), (130) and a first signal input terminal array (104)–(108) are provided on one half of the divided chip, and a second power supply terminal array (112), (113), (130) and a second signal input terminal array (114)–(118) are provided on the other half thereof. The first and second power supply terminal arrays, and the first and second signal input arrays are connected with each other through the internal wiring of the integrated circuit.

10 Claims, 9 Drawing Sheets

INTEGRATED CIRCUIT FOR DRIVING LIQUID CRYSTAL

TECHNICAL FIELD

The present invention relates to an integrated circuit, for driving liquid crystal, of the type that is mounted on a liquid crystal display substrate.

BACKGROUND ART

A liquid crystal display device of the type having a liquid crystal driving integrated circuit mounted on a liquid crystal display substrate (generally known as a chip-on-glass liquid crystal display device—hereinafter referred to as the "COG liquid crystal display device") has the problem that it requires a large press-contact area for connecting input electrodes to a flexible printed circuit (hereinafter abbreviated FPC) in order to input power and signals to the liquid crystal driving integrated circuit.

In-view of this, a lateral-lead type COG liquid crystal display device has been proposed in which input terminals of a liquid crystal driving integrated circuit are arranged along a shorter side of a substantially rectangular integrated circuit chip, with an FPC press-contact area provided on the shorter side of the integrated circuit, and electrical conductors leading from electrodes on a liquid crystal display substrate are routed to the shorter side for connection to the input terminals.

Figure 1:
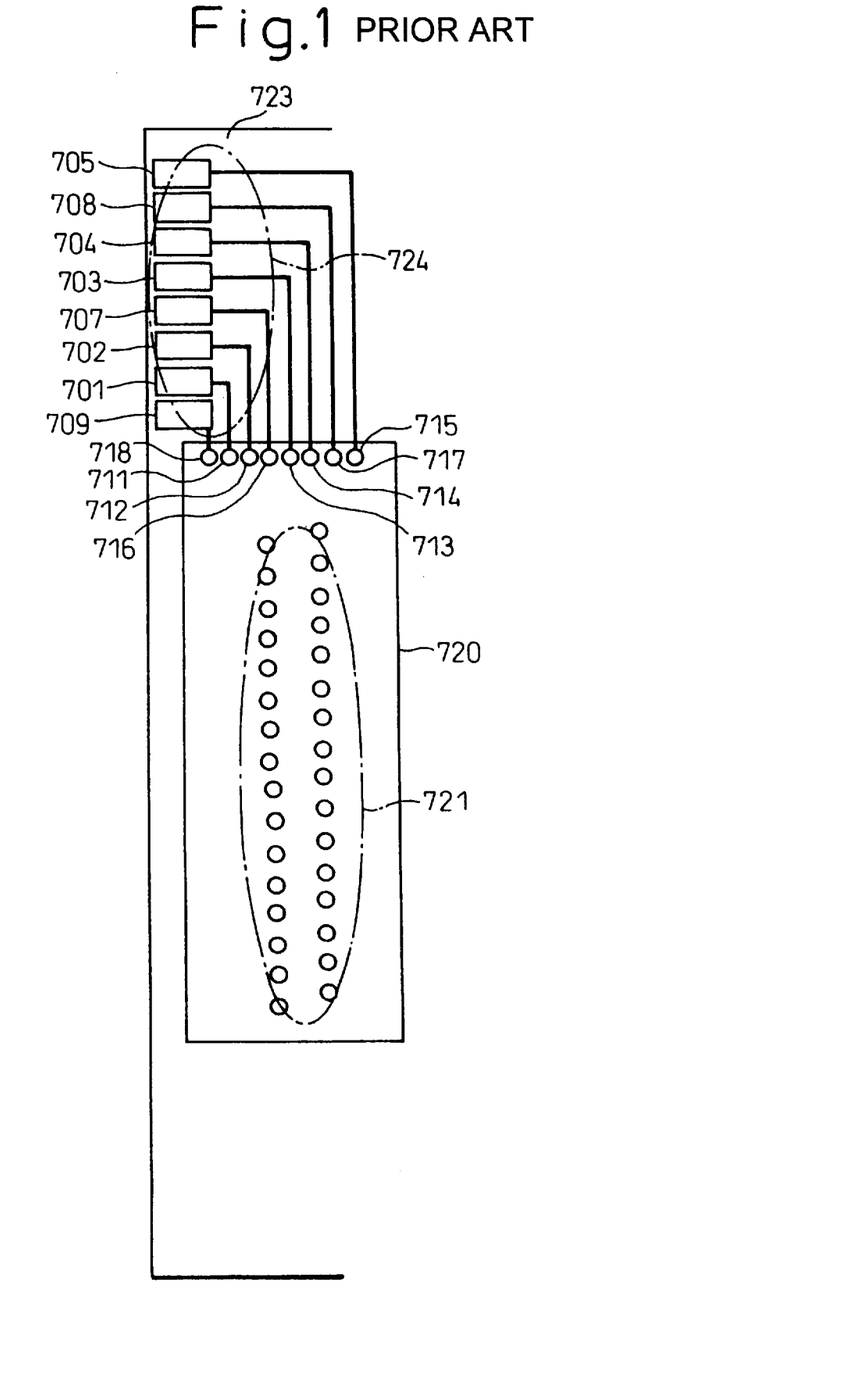
FIG. 1 is a diagram showing an input structure for a conventional liquid crystal driving integrated circuit.

FIG. 1 is a schematic diagram showing an input portion of the COG liquid crystal display device having a liquid crystal driving integrated circuit 720 mounted on a liquid crystal display substrate 723.

In the figure, an input electrode A 701 is an electrode for inputting a signal to the liquid crystal driving integrated circuit 720 via an input terminal A 711; an input electrode B 702 is an electrode for inputting a signal to the liquid crystal driving integrated circuit 720 via an input terminal B 712; an input electrode C 703 is an electrode for inputting a signal to the liquid crystal driving integrated circuit 720 via an input terminal C 713; an input electrode D 704 is an electrode for inputting a signal to the liquid crystal driving integrated circuit 720 via an input terminal D 714; and an input electrode E 705 is an electrode for inputting a signal to the liquid crystal driving integrated circuit 720 via an input terminal E 715.

A VDD electrode 707 is an electrode for supplying a high input voltage to the liquid crystal driving integrated circuit 720 via a VDD terminal 716; a VSS electrode 708 is an electrode for supplying a low input voltage to the liquid crystal driving integrated circuit 720 via a VSS terminal 717; and a VM electrode 709 is an electrode for supplying an intermediate input voltage to the liquid crystal driving integrated circuit 720 via a VM terminal 718.

Here, the intermediate input voltage refers to an intermediate-level voltage potential prepared separately from the high and low input voltages. An output terminal array 721 is provided to drive the liquid crystal. A press-contact area 724 provides a space for connecting the input electrodes to the FPC.

In the above-described lateral-lead type liquid crystal driving integrated circuit, since a large number of signal terminals and power supply terminals are arranged along one of the shorter sides of the liquid crystal driving integrated circuit, the arrangement of electrical conductors brought out for connection to the input electrodes and power supply electrodes becomes complex, and the conductors must be made thin because of the limited space. This increases the resistance of the signal electrodes and power supply electrodes, posing various problems when driving the liquid crystal.

Furthermore, when using more than one lateral-lead type liquid crystal driving integrated circuit, as many FPC press-contact areas have to be provided as there are liquid crystal driving integrated circuits.

DISCLOSURE OF THE INVENTION

In a liquid crystal display substrate using a lateral-lead type liquid crystal driving integrated circuit, an object of the present invention is to simplify the arrangement of conductor leads brought out for connection to the power supply electrodes and signal electrodes while, at the same time, reducing the resistance of the conductor leads.

Another object of the present invention is to provide an arrangement of power supply terminals and signal terminals that minimizes the FPC press-contact area.

To achieve the above objects, the present invention provides a liquid crystal driving integrated circuit mounted directly on a liquid crystal substrate, wherein the integrated circuit comprises a plurality of power supply terminal arrays and/or a plurality of signal input terminal arrays, and a substantially rectangular integrated circuit chip containing the integrated circuit is divided into two halves along a line intersecting, at right angles, the longer sides of the chip. A first power supply terminal array and/or a first signal input terminal array are provided on one half of the divided, substantially rectangular integrated circuit chip, and a second power supply terminal array and/or a second signal input terminal array are provided on the other half thereof, wherein the first and second power supply terminal arrays are connected with each other.

The power supply terminal arrays each include a high voltage power input terminal, a low voltage power input terminal, and an intermediate voltage power input terminal.

Further, the first power supply terminal array and the first signal input terminal array are arranged in a clustered fashion along a shorter side of the one half of the integrated circuit chip, and the second power supply terminal array and the second signal input terminal array are arranged in a clustered fashion along a shorter side of the other half chip, wherein the first power supply terminal array is located outward of the first signal input terminal array, and the second power supply terminal array is located outward of the second signal input terminal array.

In an alternative embodiment, the liquid crystal driving integrated circuit of the present invention comprises a plurality of power supply terminal arrays and/or a plurality of signal input terminal arrays, and a substantially rectangular integrated circuit chip containing the integrated circuit is divided into two halves along a line intersecting at right angles with the longer sides of the chip. A first power supply terminal array and/or a first signal input terminal array are provided on one half of the integrated circuit chip, a second power supply terminal array and/or a second signal input terminal array are provided on the other half thereof, and a third power supply terminal array is provided between the first power supply terminal array and the second power supply terminal array, wherein the terminal arrays are connected with one another.

The first and second power supply terminal arrays each include a high voltage power input terminal, a low voltage power input terminal, and an intermediate voltage power input terminal, and the third power supply terminal array includes an intermediate voltage power input terminal.

Further, the first terminal arrays are arranged along a shorter side of the one half chip, the first power supply terminal array being located outward of the first signal input terminal array, while the second terminal arrays are arranged along a shorter side of the other half chip, the second power supply terminal array being located outward of the second signal input terminal array.

In a further alternative embodiment, multiples of the substantially rectangular integrated circuit chip are arranged with shorter sides thereof opposing each other, and the first power supply terminal array and first signal input terminal array and the second power supply terminal array and second signal input terminal array, respectively arranged along the opposing shorter sides, are connected with each other.

In the above description, the term "terminal arrays" collectively refers to the power supply terminal array and signal input terminal array.

ADVANTAGEOUS EFFECT OF THE INVENTION

In the case of the conventional COG liquid crystal display device shown in FIG. 1, the space that can be used for routing the conductors for connection to the input electrodes is limited, because inputs are supplied to the liquid crystal driving integrated circuit from only one side thereof. As a result, the arrangement of the conductors becomes complex, and also the conductor leads becomes thin, resulting in increased resistance. This adversely affects the power supply and input signals that require very accurate timing. In view of this, the present invention alleviates the problem of the conductor arrangement and reduces the resistance, by providing the input terminals of the liquid crystal driving integrated circuit on both of the shorter sides of the integrated circuit chip.

Furthermore, the VM, VDD, and VSS terminals for which low resistance is particularly needed are arranged on both of the shorter sides; this makes it possible to reduce the conductor length of the FPC press-contact area connecting the integrated circuit chip to the electrode leads.

More specifically, by providing the same input terminals on both of the shorter sides, the configuration allows the conductors to be brought out from one side or from both sides as desired. Furthermore, when using more than one liquid crystal driving integrated circuit, the number of FPC electrodes can be reduced by interconnecting the liquid crystal driving integrated circuits by means of cascade electrodes.

DETAILED DESCRIPTION OF THE INVENTION

Embodiments of the present invention will be described below with reference to drawings.

(Embodiment 1)

Figure 2:
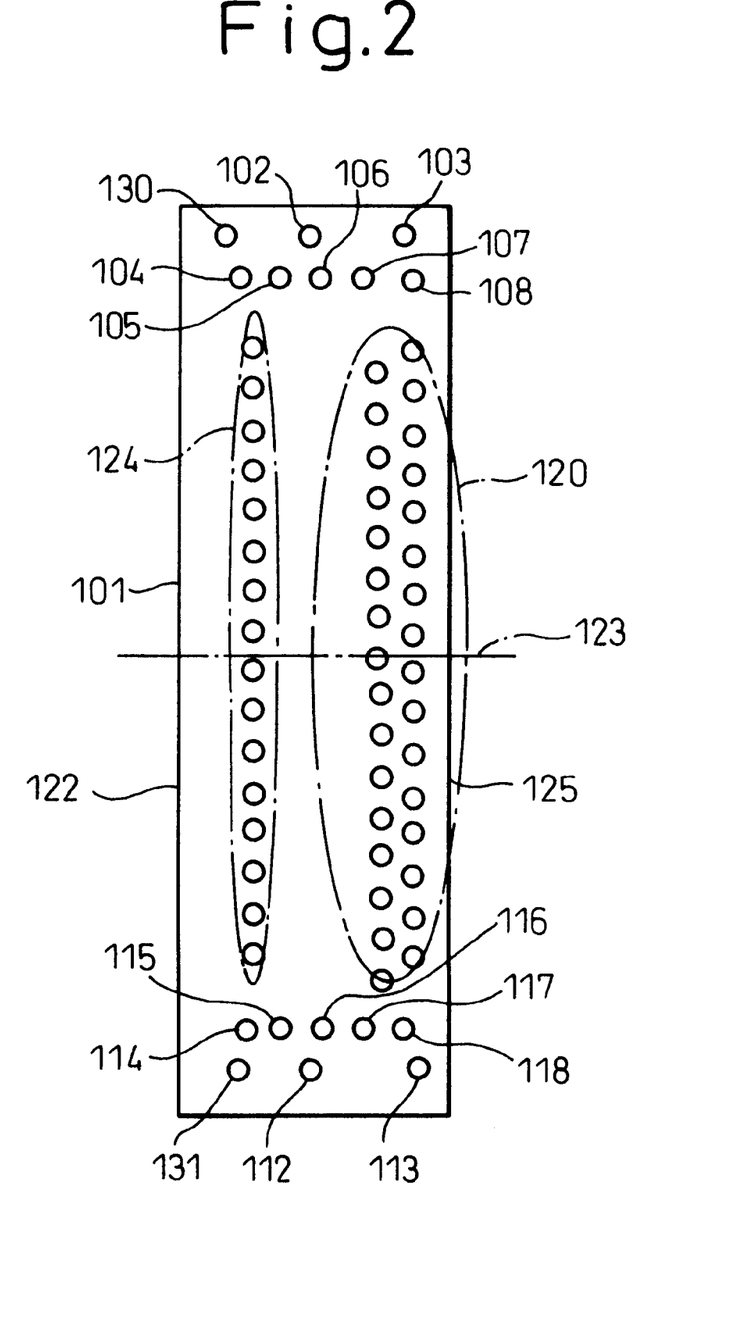
FIG. 2 is an external view of a liquid crystal driving integrated circuit according to one embodiment of the present invention.

FIG. 2 shows an external view of a liquid crystal driving integrated circuit 101 according to one embodiment of the present invention. As shown, the integrated circuit chip containing the integrated circuit 101 is substantially rectangular in shape, having shorter and longer sides.

In the figure, a VDD input terminal 102 is a high voltage supply terminal; a VSS input terminal 103 is a low voltage supply terminal; and a VM input terminal 130 is an intermediate voltage supply terminal.

A signal A terminal 104 is an input terminal for inputting a signal A; a signal B terminal 105 is an input terminal for inputting a signal B; a signal C terminal 106 is an input terminal for inputting a signal C; a signal D terminal 107 is an input terminal for inputting a signal D; and a signal E terminal 108 is an input terminal for inputting a signal E.

The signal input terminals are located inward of the power supply terminals. Input terminals for those signals for which the effect of the lead conductor resistance needs to be reduced are located close to an input edge 122.

A VDD input terminal 112, like the VDD input terminal 102, is a high voltage supply terminal; a VSS input terminal 113, like the VSS input terminal 103, is a low voltage supply terminal; and a VM input terminal 131, like the VM input terminal 130, is an intermediate voltage supply terminal.

A signal A terminal 114, like the signal A terminal 104, is an input terminal for inputting the signal A; a signal B terminal 115, like the signal B terminal 105, is an input terminal for inputting the signal B; a signal C terminal 116, like the signal C terminal 106, is an input terminal for inputting the signal C; a signal D terminal 117, like the signal D terminal 107, is an input terminal for inputting the signal D; and a signal E terminal 118, like the signal E terminal 108, is an input terminal for inputting the signal E.

These power supply terminals and signal input terminals are connected by conductors within the liquid crystal driving integrated circuit 101. The integrated circuit 101 is divided into two halves along a line 123 intersecting, at right angles, the longer sides of the substantially rectangular integrated circuit chip, and the terminals are arranged substantially symmetrical about the line 123.

An output terminal array 120 consists of a plurality of output terminals arranged along an output edge 125.

A VM terminal array 124 consists of a plurality of intermediate voltage supply terminals, and can be used to lower the input resistance in a structure where the FPC press-contact area is provided on the input edge 122 side.

(Embodiment 2)

Figure 3:
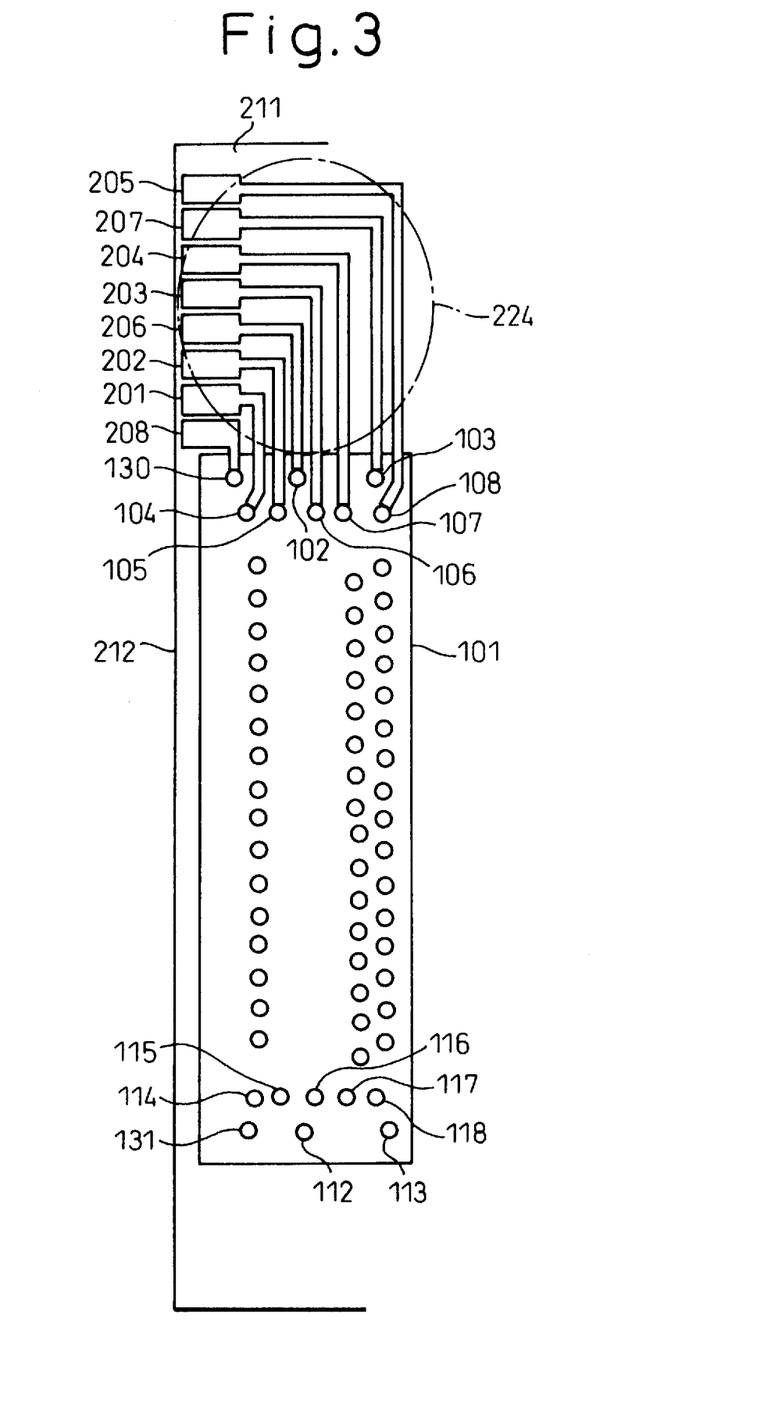
FIG. 3 is a diagram showing an embodiment of an input structure for the liquid crystal driving integrated circuit of the present invention.

FIG. 3 shows a single-side lateral input type liquid crystal display substrate 211 having mounted thereon the liquid crystal driving integrated circuit 101 of the present invention shown in FIG. 2.

In the figure, an input electrode A 201 is an electrode for inputting a signal to the liquid crystal driving integrated circuit 101 via the input terminal A 104; an input electrode B 202 is an electrode for inputting a signal to the liquid crystal driving integrated circuit 101 via the input terminal B 105; an input electrode C 203 is an electrode for inputting a signal to the liquid crystal driving integrated circuit 101 via the input terminal C 106; an input electrode D 204 is an electrode for inputting a signal to the liquid crystal driving integrated circuit 101 via the input terminal D 107; and an input electrode E 205 is an electrode for inputting a signal to the liquid crystal driving integrated circuit 101 via the input terminal E 108.

A VDD electrode 206 is an electrode for supplying power to the liquid crystal driving integrated circuit 101 via the VDD power supply terminal 102; a VSS electrode 207 is an electrode for supplying power to the liquid crystal driving integrated circuit 101 via the VSS terminal 103; and a VM electrode 208 is an electrode for supplying power to the liquid crystal driving integrated circuit 101 via the VM terminal 130.

A press-contact area 224 provides a space for connecting the input electrodes to the FPC.

In the above structure, since the VM terminal 130 is located nearer to an input edge 212, the distance from the FPC becomes correspondingly shorter, reducing the resistance of the VM electrode 208.

The input electrodes A 201 and B 202 are brought out of the liquid crystal driving integrated circuit 101 by being passed between the VM terminal 130 and the VDD terminal 102. The input electrodes C 203 and D 204 are brought out of the liquid crystal driving integrated circuit 101 by being passed between the VDD terminal 102 and the VSS terminal 103. The input electrode E 205 is brought out of the liquid crystal driving integrated circuit 101 by being passed alongside the VSS terminal 103.

(Embodiment 3)

Figure 4:
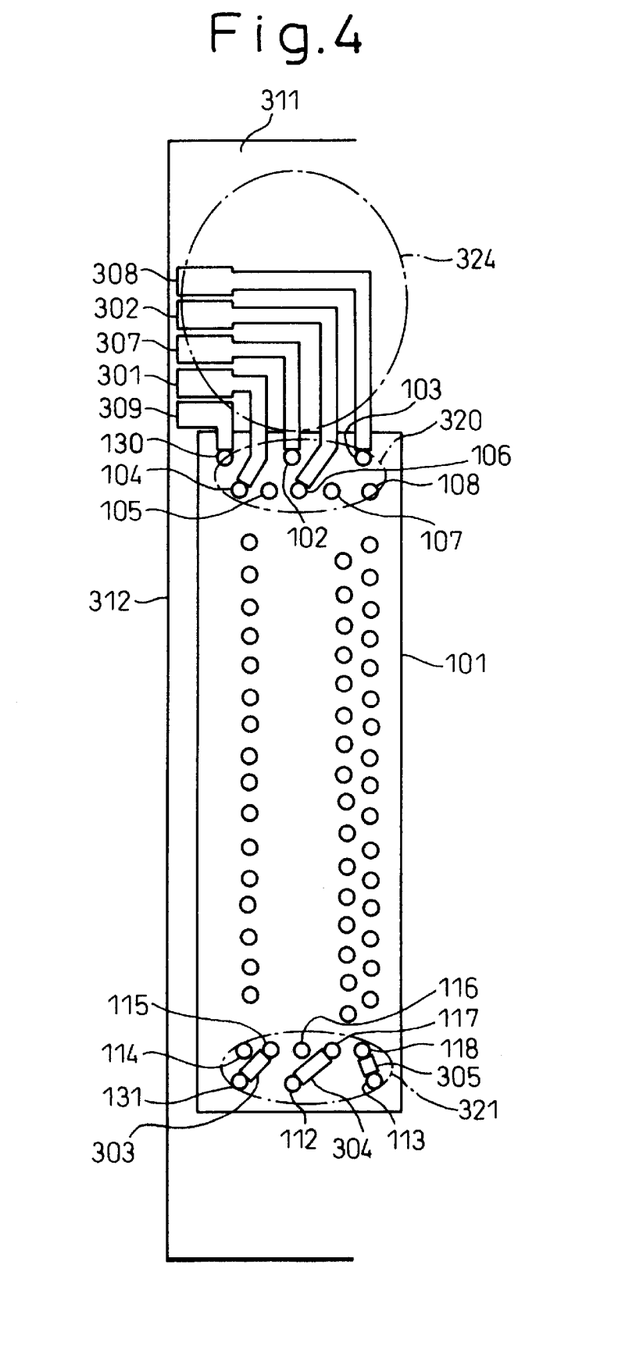
FIG. 4 is a diagram showing an embodiment of an input structure with connecting terminals for the liquid crystal driving integrated circuit of the present invention.

FIG. 4 shows a liquid crystal display substrate 311 in an embodiment where the B signal, an input signal to the liquid crystal driving integrated circuit 101, is coupled to the VM power supply, the D signal is coupled to the VDD power supply, and the E signal is coupled to the VSS power supply.

In the figure, an input electrode A 301 is an electrode for inputting a signal to the liquid crystal driving integrated circuit 101 via the input terminal A 104, and an input electrode C 302 is an electrode for inputting a signal to the liquid crystal driving integrated circuit 101 via the input terminal C 106.

The input electrode A 301 is brought out of the liquid crystal driving integrated circuit 101 by being passed between the VM terminal 130 and the VDD terminal 102. The input electrode C 302 is brought out of the liquid crystal driving integrated circuit 101 by being passed between the VDD terminal 102 and the VSS terminal 103.

An input electrode B 303 is an electrode that connects the input terminal B 115 to the VM terminal 131, an input electrode D 304 is an electrode that connects the input terminal D 117 to the VDD terminal 112, and an input electrode E 305 is an electrode that connects the input terminal E 118 to the VSS terminal 113.

A VDD electrode 307 is an electrode for supplying power to the liquid crystal driving integrated circuit 101 via the VDD power supply terminal 102; a VSS electrode 308 is an electrode for supplying power to the liquid crystal driving integrated circuit 101 via the VSS terminal 103; and a VM electrode 309 is an electrode for supplying power to the liquid crystal driving integrated circuit 101 via the VM terminal 130.

A press-contact area 324 provides a space for connecting the input electrodes to the FPC.

In this embodiment, the number of electrodes that must be brought out of a signal input area 320 is reduced to five, and the terminals to be set are located in a signal setting area 321. This arrangement serves to eliminate the problems associated with signal routing and permits the electrodes to be made thicker.

(Embodiment 4)

Figure 5:
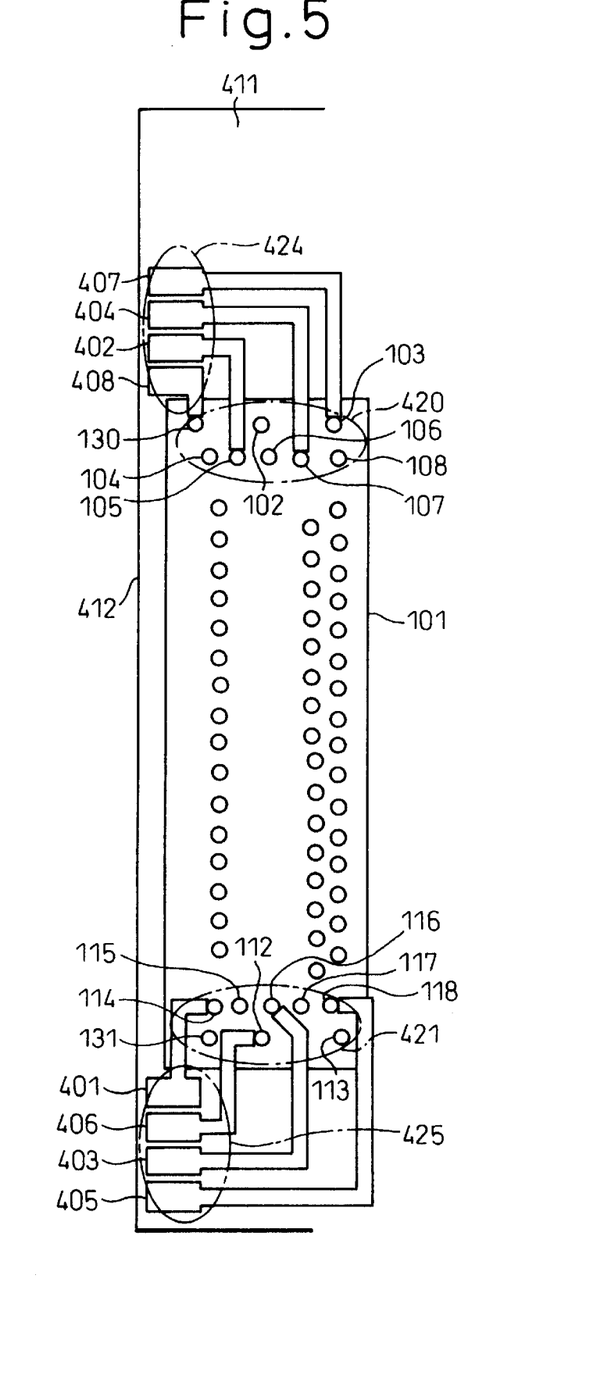
FIG. 5 is a diagram showing an embodiment of a two-side input structure for the liquid crystal driving integrated circuit of the present invention.

FIG. 5 shows a both-side lateral input type liquid crystal display substrate 411 having mounted thereon the liquid crystal driving integrated circuit 101 of the present invention shown in FIG. 2.

In the figure, an input electrode A 401 is an electrode for inputting a signal to the liquid crystal driving integrated circuit 101 via the input terminal A 114; an input electrode B 402 is an electrode for inputting a signal to the liquid crystal driving integrated circuit 101 via the input terminal B 105; an input electrode C 403 is an electrode for inputting a signal to the liquid crystal driving integrated circuit 101 via the input terminal C 116; an input electrode D 404 is an electrode for inputting a signal to the liquid crystal driving integrated circuit 101 via the input terminal D 107; and an input electrode E 405 is an electrode for inputting a signal to the liquid crystal driving integrated circuit 101 via the input terminal E 118.

A VDD electrode 406 is an electrode for supplying power to the liquid crystal driving integrated circuit 101 via the VDD power supply terminal 112; a VSS electrode 407 is an electrode for supplying power to the liquid crystal driving integrated circuit 101 via the VSS terminal 103; and a VM electrode 408 is an electrode for supplying power to the liquid crystal driving integrated circuit 101 via the VM terminal 130.

A first press-contact area 424 and a second press-contact area 425 each provide a space for connecting the input electrodes to the FPC.

The input electrode B 402 is brought out of the liquid crystal driving integrated circuit 101 by being passed between the VM terminal 130 and the VDD terminal 102, and the input electrode D 404 is brought out of the liquid crystal driving integrated circuit 101 by being passed between the VDD terminal 102 and the VSS terminal 103.

The input electrode A 401 is brought out of the liquid crystal driving integrated circuit 101 by being passed alongside the VM terminal 131, the input electrode C 403 is brought out of the liquid crystal driving integrated circuit 101 by being passed between the VDD terminal 112 and the VSS terminal 113, and the input electrode E 405 is brought out of the liquid crystal driving integrated circuit 101 by being passed alongside the VSS terminal 113.

A VDD electrode 406 is an electrode for supplying power to the liquid crystal driving integrated circuit 101 via the VDD power supply terminal 112; a VSS electrode 407 is an electrode for supplying power to the liquid crystal driving integrated circuit 101 via the VSS terminal 103; and a VM electrode 408 is an electrode for supplying power to the liquid crystal driving integrated circuit 101 via the VM terminal 130.

In this embodiment, the number of electrodes that must be brought out of each of signal input areas 420 and 421 is as few as four since the electrodes are divided between the two sides. This arrangement serves to eliminate the problems associated with signal routing and permits the electrodes to be made thicker.

(Embodiment 5)

Figure 6:
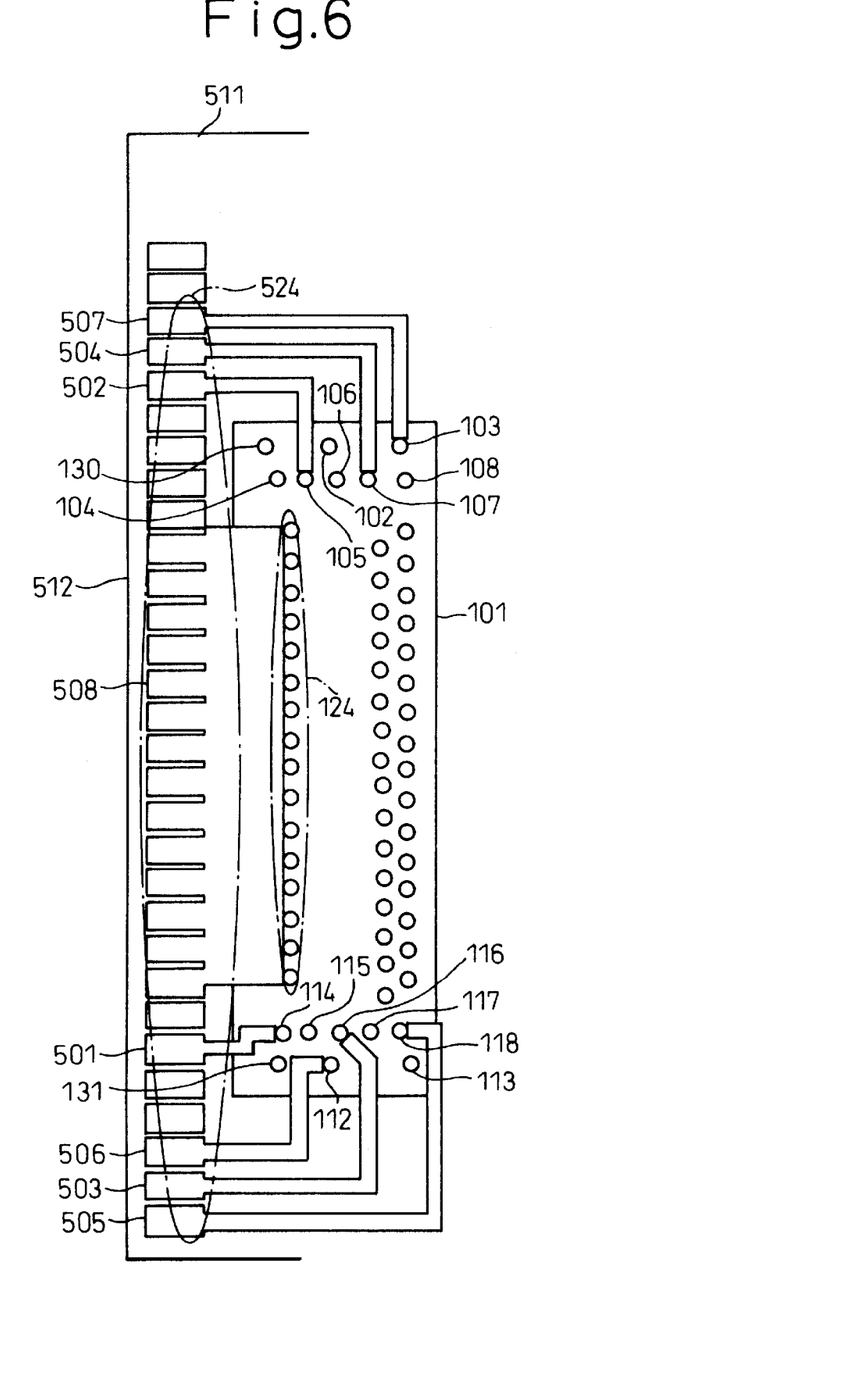
FIG. 6 is a diagram showing another embodiment of the input structure for the liquid crystal driving integrated circuit of the present invention.

FIG. 6 shows a common input type liquid crystal display substrate 511 having mounted thereon the liquid crystal driving integrated circuit 101 of the present invention shown in FIG. 2.

In the figure, an input electrode A 501 is an electrode for inputting a signal to the liquid crystal driving integrated circuit 101 via the input terminal A 114; an input electrode B 502 is an electrode for inputting a signal to the liquid crystal driving integrated circuit 101 via the input terminal B 105; an input electrode C 503 is an electrode for inputting a signal to the liquid crystal driving integrated circuit 101 via the input terminal C 116; an input electrode D 504 is an electrode for inputting a signal to the liquid crystal driving integrated circuit 101 via the input terminal D 107; and an input electrode E 505 is an electrode for inputting a signal to the liquid crystal driving integrated circuit 101 via the input terminal E 118.

A VDD electrode 506 is an electrode for supplying power to the liquid crystal driving integrated circuit 101 via the VDD power supply terminal 112; a VSS electrode 507 is an electrode for supplying power to the liquid crystal driving integrated circuit 101 via the VSS terminal 103; and a VM electrode 508 is an electrode for supplying power to the liquid crystal driving integrated circuit 101 via the VM terminal array 124.

A press-contact area 524 provides a space for connecting the input electrodes to the FPC. In this embodiment, since the VM electrode 508 is formed wide, the VM power is supplied to the integrated circuit 101 through a low resistance path.

(Embodiment 6)

Figure 7:
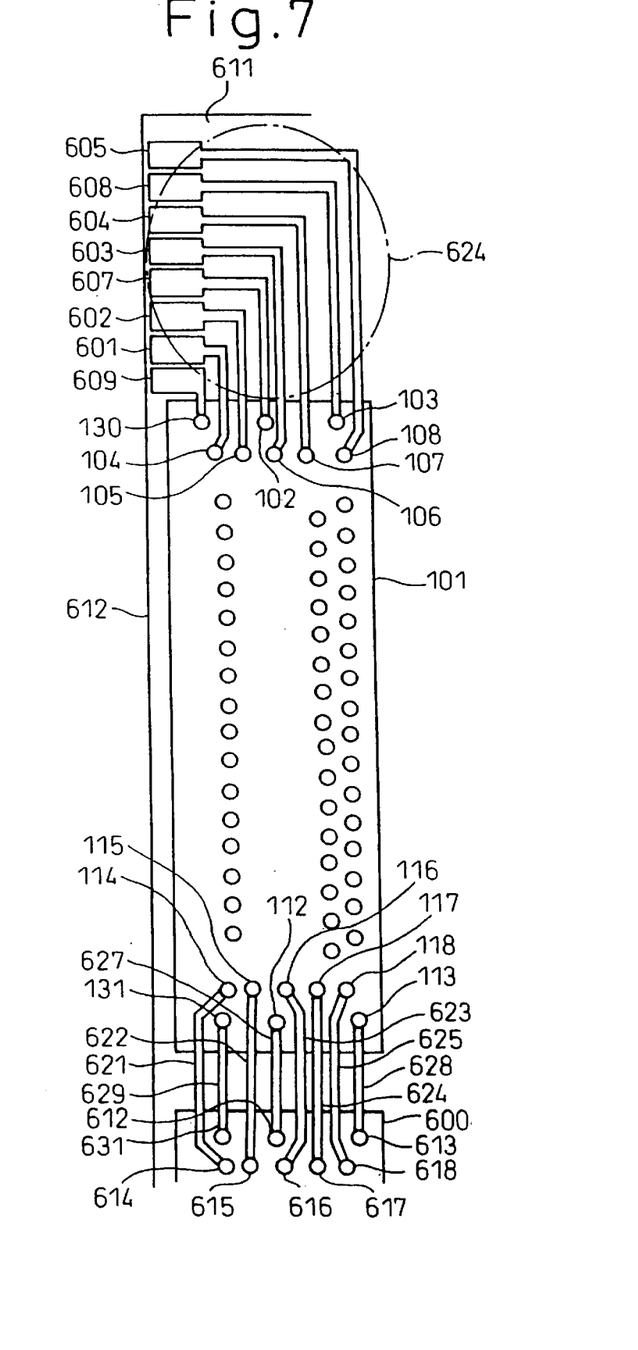
FIG. 7 is a diagram showing an embodiment of the input structure when multiples of the liquid crystal driving integrated circuit of the present invention are interconnected.

FIG. 7 shows a lateral input type liquid crystal display substrate 611 having mounted thereon the liquid crystal driving integrated circuit 101 of the present invention shown in FIG. 2 and a second liquid crystal driving integrated circuit 600, one connected in cascade with the other.

In the figure, an input electrode A 601 is an electrode for inputting a signal to the liquid crystal driving integrated circuit 101 via the input terminal A 104; an input electrode B 602 is an electrode for inputting a signal to the liquid crystal driving integrated circuit 101 via the input terminal B 105; an input electrode C 603 is an electrode for inputting a signal to the liquid crystal driving integrated circuit 101 via the input terminal C 106; an input electrode D 604 is an electrode for inputting a signal to the liquid crystal driving integrated circuit 101 via the input terminal D 107; and an input electrode E 605 is an electrode for inputting a signal to the liquid crystal driving integrated circuit 101 via the input terminal E 108.

A cascade electrode A 621 is an electrode that connects the signal A terminal 114 on the liquid crystal driving integrated circuit 101 to a signal A terminal 614 on the liquid crystal driving integrated circuit 600. A cascade electrode B 622 is an electrode that connects the signal B terminal 115 on the liquid crystal driving integrated circuit 101 to a signal B terminal 615 on the liquid crystal driving integrated circuit 600.

Likewise, a cascade electrode C 623 is an electrode that connects the signal C terminal 116 on the liquid crystal driving integrated circuit 101 to a signal C terminal 616 on the liquid crystal driving integrated circuit 600. A cascade electrode D 624 is an electrode that connects the signal D terminal 117 on the liquid crystal driving integrated circuit 101 to a signal D terminal 617 on the liquid crystal driving integrated circuit 600. A cascade electrode E 625 is an electrode that connects the signal E terminal 118 on the liquid crystal driving integrated circuit 101 to a signal E terminal 618 on the liquid crystal driving integrated circuit 600.

A VDD electrode 607 is an electrode for supplying power to the liquid crystal driving integrated circuit 101 via the VDD power supply terminal 102; a VSS electrode 608 is an electrode for supplying power to the liquid crystal driving integrated circuit 101 via the VSS terminal 103; and a VM electrode 609 is an electrode for supplying power to the liquid crystal driving integrated circuit 101 via the VM terminal 130.

A cascade VDD electrode 627 is an electrode that connects the VDD terminal 112 on the liquid crystal driving integrated circuit 101 to a VDD terminal 612 on the liquid crystal driving integrated circuit 600. A cascade VSS electrode 628 is an electrode that connects the VSS terminal 113 on the liquid crystal driving integrated circuit 101 to a VSS terminal 613 on the liquid crystal driving integrated circuit 600. A cascade VM electrode 629 is an electrode that connects the VM terminal 131 on the liquid crystal driving integrated circuit 101 to a VM terminal 631 on the liquid crystal driving integrated circuit 600.

A press-contact area 624 provides a space for connecting the input electrodes to the FPC.

Signal A is input to the liquid crystal driving integrated circuit 600 via the signal A electrode 601, the signal A terminal 104, a conductor within the liquid crystal driving integrated circuit 101, the signal A terminal 114, the cascade electrode A 621, and the signal A terminal 614.

Signal B is input to the liquid crystal driving integrated circuit 600 via the signal B electrode 602, the signal B terminal 105, a conductor within the liquid crystal driving integrated circuit 101, the signal B terminal 115, the cascade electrode B 622, and the signal B terminal 615.

Signal C is input to the liquid crystal driving integrated circuit 600 via the signal C electrode 603, the signal C terminal 106, a conductor within the liquid crystal driving integrated circuit 101, the signal C terminal 116, the cascade electrode C 623, and the signal C terminal 616.

Signal D is input to the liquid crystal driving integrated circuit 600 via the signal D electrode 604, the signal D terminal 107, a conductor within the liquid crystal driving integrated circuit 101, the signal D terminal 117, the cascade electrode D 624, and the signal D terminal 617.

Signal E is input to the liquid crystal driving integrated circuit 600 via the signal E electrode 605, the signal E terminal 108, a conductor within the liquid crystal driving integrated circuit 101, the signal E terminal 118, the cascade electrode E 625, and the signal E terminal 618.

VDD power is input to the liquid crystal driving integrated circuit 600 via the VDD electrode 607, the VDD terminal 102, a conductor within the liquid crystal driving integrated circuit 101, the VDD terminal 112, the cascade VDD electrode 627, and the VDD input terminal 612.

VSS power is input to the liquid crystal driving integrated circuit 600 via the VSS electrode 608, the VSS terminal 103, a conductor within the liquid crystal driving integrated circuit 101, the VSS terminal 113, the cascade VSS electrode 628, and the VSS terminal 613.

VM power is input to the liquid crystal driving integrated circuit 600 via the VM electrode 609, the VM terminal 130, a conductor within the liquid crystal driving integrated circuit 101, the VM terminal 131, the cascade VM electrode 629, and the VM input terminal 631.

In this way, by supplying inputs laterally to one side of the liquid crystal driving integrated circuit 101, more than one liquid crystal driving integrated circuit can be driven.

(Embodiment 7)

Figure 8:
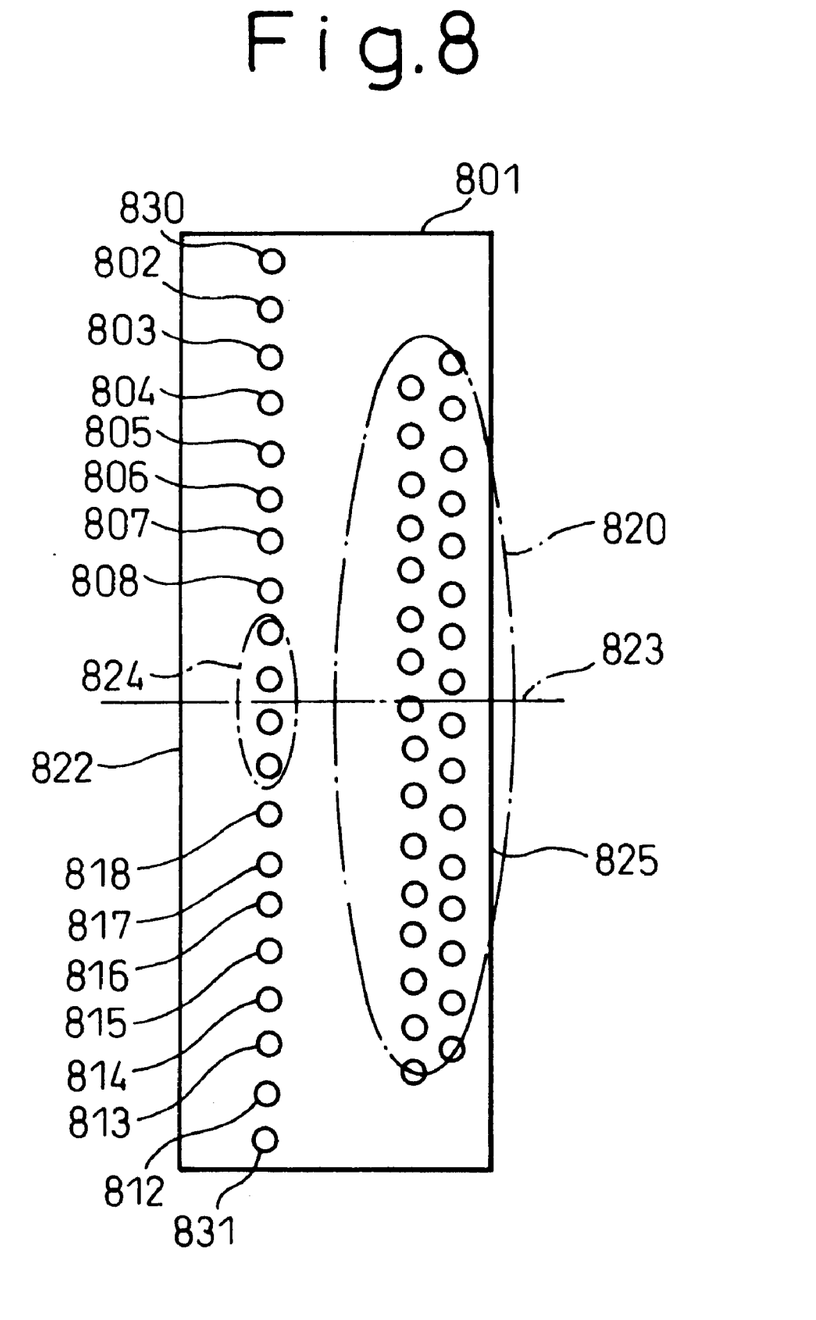
FIG. 8 is an external view of a liquid crystal driving integrated circuit according to another embodiment of the present invention.

FIG. 8 shows an external view of a liquid crystal driving integrated circuit 801 according to another embodiment of the present invention. In this embodiment, the input terminals are arranged along a longer side of a substantially rectangular integrated circuit chip. In the figure, a VDD terminal 802 is a high voltage supply terminal; a VSS terminal 803 is a low voltage supply terminal; and a VM terminal 830 is an intermediate voltage supply terminal.

A signal A terminal 804 is an input terminal for inputting a signal A; a signal B terminal 805 is an input terminal for inputting a signal B; a signal C terminal 806 is an input terminal for inputting a signal C; a signal D terminal 807 is an input terminal for inputting a signal D; and a signal E terminal 808 is an input terminal for inputting a signal E.

The signal input terminals are located inward of the power supply terminals, and input terminals for those signals for which the effect of the lead conductor resistance needs to be reduced are located close to the shorter sides of the liquid crystal driving integrated circuit 801.

A VDD terminal 812, like the VDD terminal 802, is a high voltage supply terminal; a VSS terminal 813, like the VSS terminal 803, is a low voltage supply terminal; and a VM terminal 831, like the VM terminal 830, is an intermediate voltage supply terminal.

A signal A terminal 814, like the signal A terminal 804, is an input terminal for inputting the signal A; a signal B terminal 815, like the signal B terminal 805, is an input terminal for inputting the signal B; a signal C terminal 816, like the signal C terminal 806, is an input terminal for inputting the signal C; a signal D terminal 817, like the signal D terminal 807, is an input terminal for inputting the signal D; and a signal E terminal 818, like the signal E terminal 808, is an input terminal for inputting the signal E.

These power supply terminals and signal input terminals are connected by conductors within the liquid crystal driving integrated circuit 801. The integrated circuit 801 is divided into two halves along a line 823 intersecting at right angles with the longer sides of the substantially rectangular integrated circuit chip, and the terminals are arranged substantially symmetrical about the line 823.

An output terminal array 820 consists of a plurality of output terminals arranged along an output edge 825.

A VM terminal array 824 consists of a plurality of intermediate voltage supply terminals, and can be used to lower the input resistance in a structure where the FPC press-contact area is provided on the input edge 822 side.
(Embodiment 8)

Figure 9:
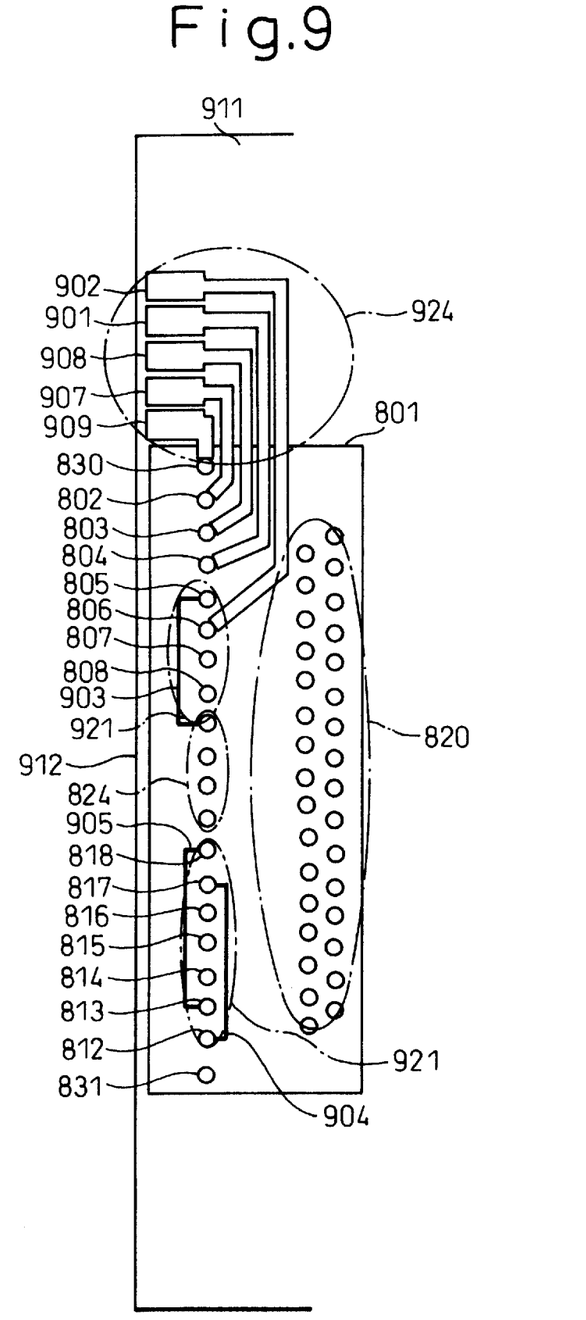
FIG. 9 is a diagram showing an embodiment of an input structure with connecting terminals for the liquid crystal driving integrated circuit of the present invention.

FIG. 9 shows an embodiment where the B signal, an input signal to the liquid crystal driving integrated circuit 801, is coupled to the VM power supply and the E signal is coupled to the VSS power supply.

In the figure, an input electrode A 901 is an electrode for inputting a signal to the liquid crystal driving integrated circuit 801 via the input terminal A 804, and an input electrode C 902 is an electrode for inputting a signal to the liquid crystal driving integrated circuit 801 via the input terminal C 806.

The input electrode A 901 is connected to the signal A terminal 804 by being passed through a press-contact area 924 and over the shorter side of the liquid crystal driving integrated circuit 801. The input electrode C 902 is connected to the signal C terminal 806 by being passed through the press-contact area 924 and over the shorter side of the liquid crystal driving integrated circuit 801.

An input electrode B 903 is an electrode that connects the input terminal B 805 to the VM terminal array 824. An input electrode D 804 is an electrode that connects the input terminal D 817 to the VDD terminal 812. An input electrode E 905 is an electrode that connects the input terminal E 818 to the VSS terminal 813.

A VDD electrode 907 is an electrode for supplying power to the liquid crystal driving integrated circuit 801 via the VDD power supply terminal 802. A VSS electrode 908 is an electrode for supplying power to the liquid crystal driving integrated circuit 801 via the VSS power supply terminal 803. A VM electrode 909 is an electrode for supplying power to the liquid crystal driving integrated circuit 801 via the VM terminal 830.

A press-contact area 924 provides a space for connecting the input electrodes to the FPC.

In this embodiment, the number of electrodes that must be brought out of the press-contact area 924 serving as a signal input area is reduced to five, and the terminals for connection are located in a signal setting area 921. This arrangement serves to eliminate the problems associated with signal routing and permits the electrodes to be made thicker.

The integrated circuit 801 is also applicable to any one of the first to sixth embodiments of the integrated circuit 101.

What is claimed is:

1. A liquid crystal driving integrated circuit mounted directly on a liquid crystal substrate, comprising:
   a substantially rectangular integrated circuit chip containing the integrated circuit and having longer sides and shorter sides, and divided into two halves along a line intersecting, at right angles, the longer sides of the chip,
   a first power supply terminal array and a first signal input terminal array provided along a shorter side on one half of the substantially rectangular integrated circuit chip, and a second power supply terminal array and a second signal input terminal array provided along a shorter side on the other half of the integrated circuit chip,
   the first and second power supply terminal arrays connected with each other and the first and second signal input terminal arrays connected with each other, and
   the first power supply terminal array arranged outward of the first signal input terminal array, and the second power supply terminal array arranged outward of the second signal input terminal array.

2. A liquid crystal driving integrated circuit as claimed in claim 1, wherein said first power supply terminal array is connected to electrical conductors introduced through the shorter side on one half of the chip.

3. A liquid crystal driving integrated circuit as claimed in claim 1, wherein said first power supply terminal array and said first signal input terminal array are connected to electrical conductors introduced through the shorter side on one half of the chip.

4. A liquid crystal driving integrated circuit as claimed in claim 1, wherein said first power supply terminal array and said first signal input terminal array are connected to electrical conductors introduced through the shorter side on one half of the chip, and said second signal input terminal array is connected to said second power supply terminal array.

5. A liquid crystal driving integrated circuit as claimed in claim 1, wherein some of the terminals in said first power supply terminal array and first signal input terminal array are connected to electrical conductors introduced through the shorter side on one half of the chip, while the power supply terminals and signal input terminals in said second terminal arrays, which correspond to the power supply terminals and signal input terminals in said first terminal arrays that are not connected to the electrical conductors introduced through the shorter side on one half of the chip, are connected to electrical conductors introduced through the shorter side on the other half of the chip.

6. A liquid crystal driving integrated circuit as claimed in claim 1, wherein a multiple of said substantially rectangular integrated circuit chips are arranged with shorter sides thereof opposing each other, and said first power supply terminal array and first signal input terminal array and said second power supply terminal array and second signal input terminal array, respectively arranged along said opposing shorter sides, are connected with each other.

7. A liquid crystal driving integrated circuit as claimed in claim 6 wherein said connections between the opposed shorter sides are each made by means of a cascade electrode.

8. A liquid crystal driving integrated circuit as claimed in claim 1,
   wherein the first power supply terminal array and the second power supply terminal array each include a high voltage power input terminal, a low voltage power input terminal, and an intermediate voltage power input terminal, and further comprising:
      a third power supply terminal array provided between the first power supply terminal array and the second power supply terminal array, and having an intermediate voltage power input terminal,
      the intermediate voltage power input terminal of the third power supply terminal array connected with the intermediate voltage power input terminal of the first power supply terminal array and the intermediate voltage power input terminal of the second power supply terminal array.

9. A liquid crystal driving integrated circuit as claimed in claim 8, wherein said first power supply terminal array and said first signal input terminal array are connected to electrical conductors introduced through the shorter side on one half of the chip, and said second signal input terminal array is connected to said second or said third power supply terminal array.

10. A liquid crystal driving integrated circuit as claimed in claim 8, wherein said third power supply terminal array is connected to electrical conductors introduced through a longer side of said integrated circuit chip.

* * * * *